US010123650B2

(12) United States Patent
McLaughlin et al.

(10) Patent No.: US 10,123,650 B2
(45) Date of Patent: Nov. 13, 2018

(54) VACUUM COFFEE MAKER WITH MAGNETIC COUPLING SYSTEM

(71) Applicant: Whirlpool Corporation, Benton Harbor, MI (US)

(72) Inventors: Meighan McLaughlin, Stevensville, MI (US); Wee Ng, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 163 days.

(21) Appl. No.: 14/616,584

(22) Filed: Feb. 6, 2015

(65) Prior Publication Data

US 2016/0227955 A1    Aug. 11, 2016

(51) Int. Cl.
*A47J 31/06* (2006.01)
*A47J 31/043* (2006.01)
*A47J 31/44* (2006.01)

(52) U.S. Cl.
CPC ......... *A47J 31/043* (2013.01); *A47J 31/0626* (2013.01); *A47J 31/441* (2013.01); *A47J 2031/0694* (2013.01)

(58) Field of Classification Search
CPC ........ A47J 31/04; A47J 31/043; A47J 31/057; A47J 31/0576; A47J 31/0626; A47J 31/0657; A47J 31/0684; A47J 31/0694; A47J 31/44; A47J 31/4403; A47J 31/441
See application file for complete search history.

(56) References Cited

U.S. PATENT DOCUMENTS

| | | | |
|---|---|---|---|
| 2,577,985 A | 12/1951 | Willman | |
| 2,694,769 A | 11/1954 | Huck et al. | |
| 3,224,360 A | 12/1965 | Wickenberg et al. | |
| 5,544,566 A | 8/1996 | Bersten | |
| 5,586,484 A | 12/1996 | Piazza | |
| 6,272,974 B1 * | 8/2001 | Pascotti | A47J 31/0615 99/279 |
| 2004/0149138 A1 | 8/2004 | Leung et al. | |

(Continued)

FOREIGN PATENT DOCUMENTS

| | | |
|---|---|---|
| AU | 2003300766 | 12/2003 |
| CN | 101322617 | 12/2008 |
| GB | 647087 A | 12/1950 |

(Continued)

*Primary Examiner* — Dana Ross
*Assistant Examiner* — Brandon Harvey
(74) *Attorney, Agent, or Firm* — Price Heneveld LLP

(57) ABSTRACT

A vacuum-type coffee maker includes an upper brewing unit and a lower carafe. The upper brewing unit includes a vessel and a collar disposed around a lower portion of the vessel. The collar includes a magnetic array defining an upper magnetic coupler. The lower carafe includes a vessel having a collar disposed around an upper portion of the vessel. The collar further includes a magnetic array to define a lower magnetic coupler. In assembly, the upper magnetic coupler is magnetically coupled to the lower magnetic coupler when the upper brewing unit is received on the lower carafe. A heating element is disposed in a base portion of the lower carafe. The lower carafe is removeably received on a support stand, and the heating element of the lower carafe is powered by the support stand in use during a brewing sequence.

17 Claims, 15 Drawing Sheets

(56) References Cited

U.S. PATENT DOCUMENTS

2008/0206418 A1    8/2008  Ranzoni
2009/0013876 A1    1/2009  Ranzoni

FOREIGN PATENT DOCUMENTS

| WO | 2005063090 A1 | 7/2005 | |
|---|---|---|---|
| WO | 2008012838 A1 | 1/2008 | |
| WO | 2008087673 A1 | 7/2008 | |
| WO | WO 2015024798 A1 * | 2/2015 | .......... A47J 31/0668 |

* cited by examiner

US 10,123,650 B2

VACUUM COFFEE MAKER WITH MAGNETIC COUPLING SYSTEM

FIELD OF THE INVENTION

The present device generally relates to a coffee maker, and more particularly, a vacuum-type coffee maker having an upper brewing unit and a lower carafe which are magnetically coupled to form a seal therebetween for brewing coffee according to a vacuum method.

BACKGROUND

Various vacuum-type coffee makers generally include an upper brewing unit and a lower carafe which are mechanically coupled to form a seal therebetween. In using a vacuum-type coffee maker, a certain amount of coffee is added to the upper brewing unit, the lower carafe is filled with an amount of water, and then the upper brewing unit is mechanically coupled to the lower carafe by an interlocking mechanism. When attempting to interlock the upper brewing unit and lower carafe, various mechanical features must be aligned in order to ensure that a proper seal is formed between the upper brewing unit and lower carafe. Alignment of the interlocking features is often cumbersome and therefore difficult to ensure the proper seal is formed. Thus, a vacuum-type coffee maker having a pre-interlock alignment system is desired.

SUMMARY

One aspect of the present concept includes a coffee maker having an upper brewing unit and a lower carafe. The upper brewing unit includes a vessel with upper and lower portions and a collar disposed around the lower portion of the vessel. The collar includes a magnetic array defining an upper magnetic coupler. The lower carafe is configured to receive the upper brewing unit, and includes a vessel with an upper portion and a base portion. The lower carafe further includes a collar disposed around the upper portion of the vessel. The collar further includes a magnetic array to define a lower magnetic coupler. In assembly, the upper magnetic coupler is magnetically coupled to the lower magnetic coupler when the upper brewing unit is received on the lower carafe. A heating element disposed in the base portion of the lower carafe. A support stand is configured to removeably receive the lower carafe, and the heating element of the lower carafe is powered by the support stand in use.

Another aspect of the present concept includes a coffee maker having an upper brewing unit and a lower carafe. The upper brewing unit includes a collar disposed around a lower portion thereof. The collar includes an upper landing with one or more magnets disposed therein to define an upper magnetic coupler. The lower carafe is configured to receive the upper brewing unit thereon. The lower carafe includes an upper collar disposed around an upper portion thereof. The collar of the lower carafe includes an upper landing with one or more magnets disposed therein to define a lower magnetic coupler. In assembly, the upper magnetic coupler is magnetically coupled to the lower magnetic coupler when the upper brewing unit is received on the lower carafe.

Yet another aspect of the present concept includes a method of forming a seal between an upper brewing unit and a lower carafe in a vacuum coffee maker. The method comprises the steps of 1) coupling the upper brewing unit to the lower carafe using a magnetic coupling system; 2) forming a seal between the upper brewing unit and the lower carafe; 3) aligning engagement features of the upper brewing unit with engagement features of the lower carafe; and 4) mechanically locking the engagement features of the upper brewing unit with the engagement features of the lower carafe to retain the seal formed between the upper brewing unit and the lower carafe.

These and other features, advantages, and objects of the present device will be further understood and appreciated by those skilled in the art upon studying the following specification, claims, and appended drawings.

DETAILED DESCRIPTION OF EMBODIMENTS

Figure 1:
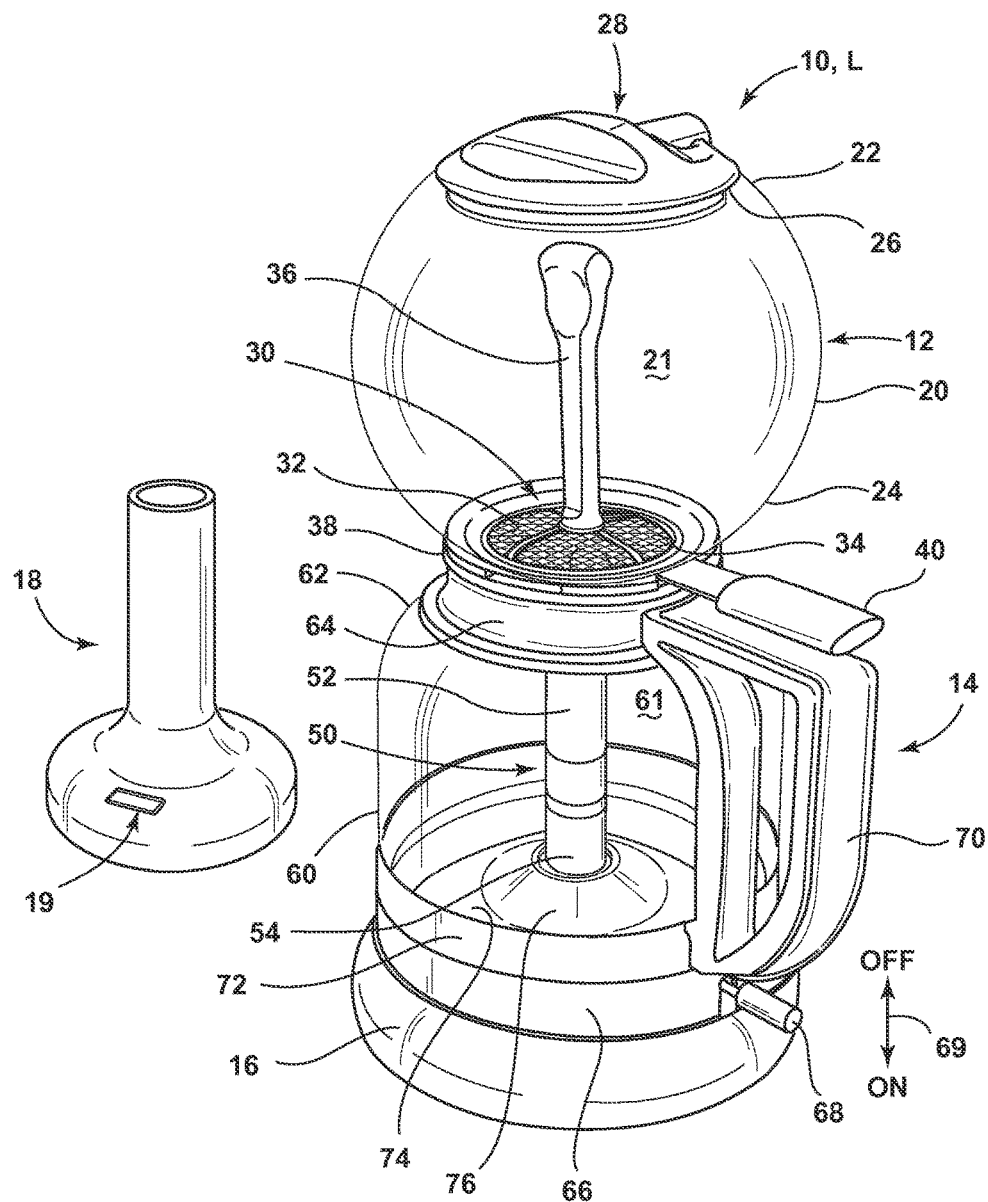
FIG. 1 is a perspective view of a vacuum-type coffee maker having an upper brewing unit coupled to a lower carafe which is positioned on a support stand and also includes a detached upper brewing unit support stand according to an embodiment of the present concept.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a vacuum-type coffee maker, according to one embodiment of the present concept. As shown in FIG. 1, the vacuum-type coffee maker 10 includes an upper brewing unit 12 disposed on a lower carafe 14, wherein the lower carafe is further supported on a support stand 16. The vacuum-type coffee maker 10 further includes a detached brewing unit stand 18 having an integrated scale device 19, as further described below.

With reference to the upper brewing unit 12 of FIG. 1, the upper brewing unit 12 generally includes a vessel 20, which defines a cavity 21 having upper and lower portions 22, 24. The upper portion 22 includes an opening 26 that opens into the cavity 21. A lid 28 is received on the opening 26 for selectively providing access to the cavity 21. The lid 28 may be twist-locked into place on opening 26, or may be friction fit to the opening 26 by a flexibly resilient ring seal. The lid 28 can also be drop-set into place on opening 26. Once the lid 28 is in place on opening 26, the cavity 21 of the upper brewing unit 12 is sealed at upper portion 22. The lower portion 24 of the vessel 20 includes a filter assembly 30, having a disc filter 32 which is received or positioned on an opening 34 disposed in the lower portion 24 of the vessel 20. The filter assembly 30 further includes an upwardly extending handle portion 36 which is engaged by a user to remove the filter assembly 30 from the upper brewing unit 12. The upper brewing unit 12 further includes a collar 38 having an outwardly extending handle 40. The collar 38 includes an upper portion of a magnetic coupling and alignment system as further described below. The outwardly extending handle 40 is used to lock the upper brewing unit 12 to the lower carafe 14 as further described below. A seal is formed between the collar 38 of the upper brewing unit 12 and the lower carafe 14 to seal the coffee maker system as further described below.

The vessel 60 is contemplated to be made from a substantially clear material, such as glass or any other like material, that can withstand a heat level generally associated with coffee brewing. The lid 28, filter assembly 30, collar 38 and outwardly extending handle 40 are contemplated to be made from a molded polymeric material, brushed or polished metal material, any other like material, or combination thereof used to provide an overall pleasing aesthetic for the coffee maker 10.

The upper brewing unit 12 further includes a transfer tube 50 having an upper portion 52 that is coupled to the collar 38, and a lower portion 54 which is disposed in the lower carafe 14 in assembly. As shown in the embodiment of FIG. 1, the transfer tube 50 is a hollow cylindrical member which extends into and fluidly connects the lower carafe 14 with the upper brewing unit 12. The upper portion 52 of the transfer tube 50 opens into opening 34 disposed in the lower portion 24 of the vessel 20 at the filter assembly 30. The lower portion 54 of the transfer tube 50 opens into the lower carafe 14 and is configured to transfer liquid between the upper brewing unit 12 and lower carafe as further described below.

As further shown in FIG. 1, the lower carafe 14 generally includes a vessel 60 which defines a cavity 61 for holding water and/or brewed coffee in use. The lower carafe 14 includes an upper portion 62 near which a collar 64 is disposed. The collar 64 includes a lower portion of a magnetic coupling and alignment system for coupling to the collar 38 of the upper brewing unit 12 as further described below. The lower carafe 14 further includes a base portion 66 which is received on support stand 16. The base portion 66 houses a heating element which is configured to heat the contents of the lower carafe 14 when triggered by an actuation switch 68 disposed on the base portion 66 and operable between ON and OFF positions as indicated by arrow 69. As further shown in FIG. 1, the lower carafe 14 further includes an outwardly extending handle 70 disposed above actuation switch 68 which is engaged by a user for positioning the lower carafe 14 on the support stand 16, as well as when using the lower carafe 14 for pouring brewed coffee. The lower carafe 14 further includes a band 72 which is generally disposed around the vessel 60 near the base portion 66. The lower carafe 14 further includes a bottom wall 74 having an upwardly extending and centrally disposed transfer tube receiving portion 76 which is configured to align with the lower portion 54 of the transfer tube 50 in assembly, as shown in FIG. 1, when the upper brewing unit 12 is coupled to the lower carafe 14. As further shown in FIG. 1, the outwardly extending handle 40 of the upper brewing unit 12 is aligned with handle 70 of the lower carafe 14, which indicates to a user that the coffee maker 10 is in a locked condition L. In the locked condition L, the coffee maker 10 defines a sealed system between the upper brewing unit 12 and the lower carafe 14.

The vessel 20 of the lower carafe 14 is contemplated to be made from a substantially clear material, such as glass or any other like material, that can withstand a heat level generally associated with coffee brewing. The base portion 66, band 72, collar 64 and outwardly extending handle 70 are contemplated to be made from a molded polymeric material, brushed or polished metal material, any other like material, or combination thereof used to provide an overall pleasing aesthetic for the coffee maker 10.

Figure 2:
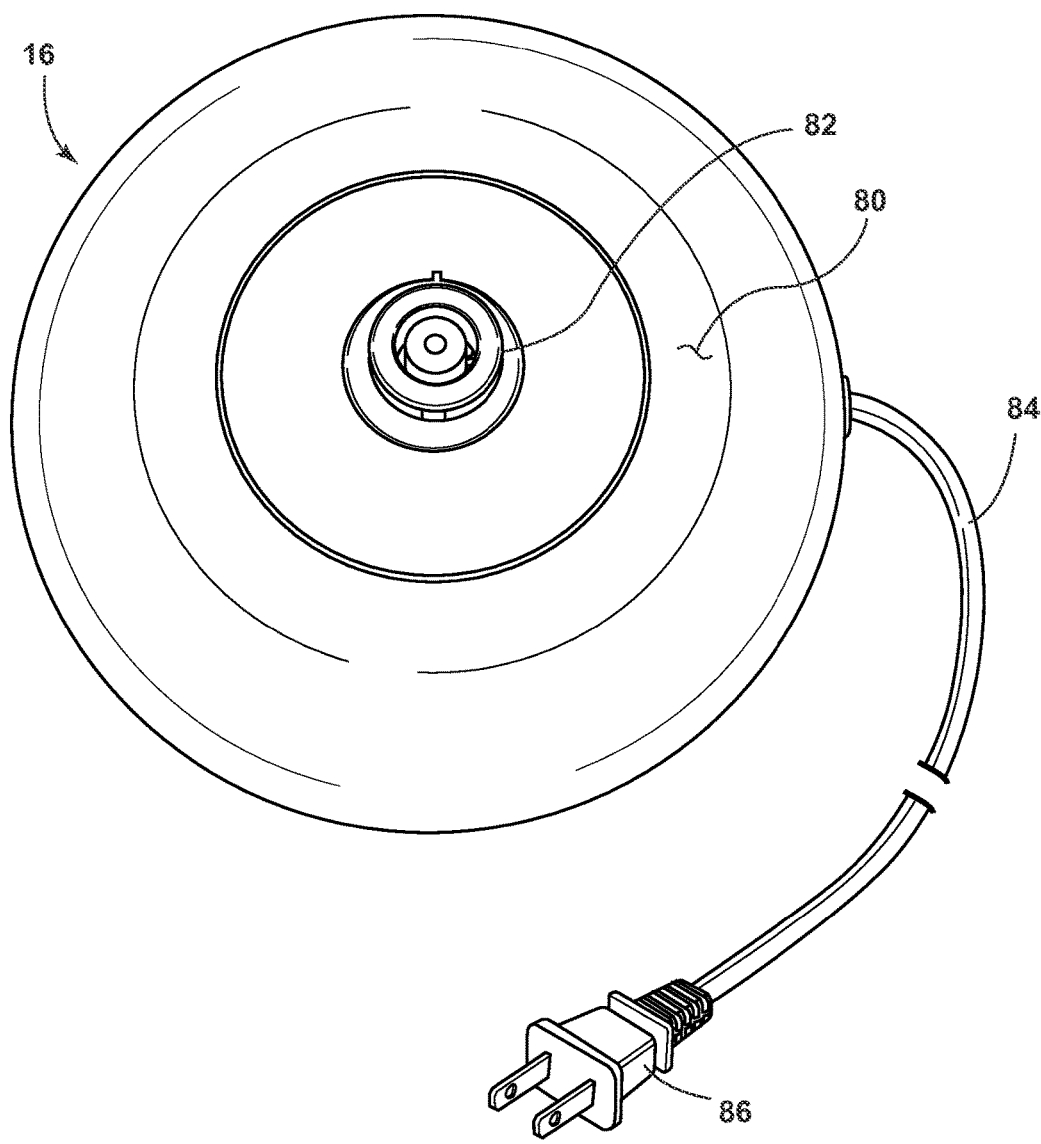
FIG. 2 is a top perspective view of the support stand a FIG. 1.

Referring now to FIG. 2, the support stand 16 is shown having the lower carafe 14 and upper brewing unit 12 removed therefrom. With the lower carafe 14 removed, a support surface 80 is revealed having a centrally disposed upwardly extending power plug 82 disposed thereon. The power plug 82 is used to electronically couple the support stand 16 with the base portion 66 of the lower carafe 14 as further described below. The support stand 16 further includes a power cord 84 having a plug 86 which is configured to connect the coffee maker 10 (FIG. 1) to an electrical receptacle for powering the coffee maker 10.

Figure 3:
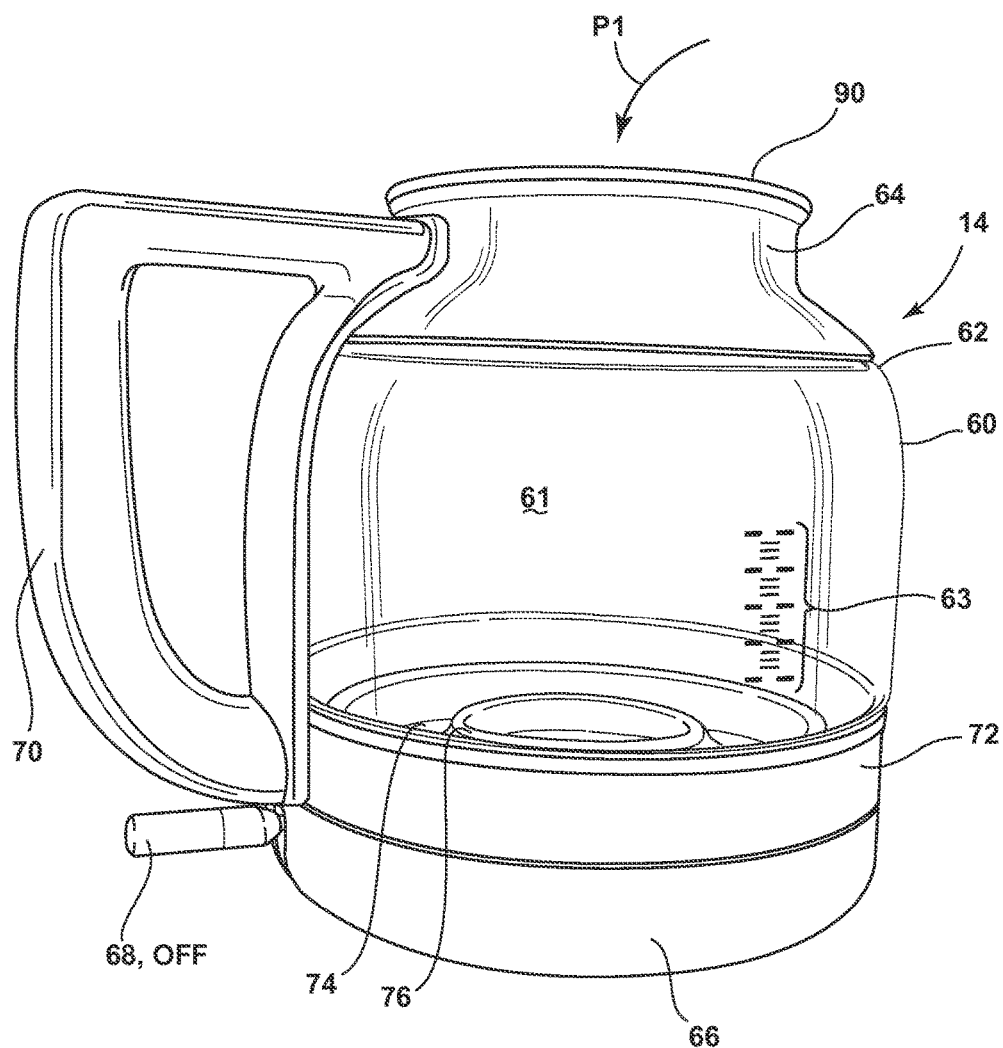
FIG. 3 is a perspective view of the lower carafe of FIG. 1 as removed from the support stand.

Referring now to FIG. 3, the lower carafe 14 is shown as removed from the support stand 16 (FIG. 2), and with the upper brewing unit 12 (FIG. 1) removed as well. The lower carafe 14 includes a number of measurement markings 63 disposed on an outer surface of the vessel 60. The measurement markings 63 are used to indicate a specific volume of liquid received in the cavity 61 of the lower carafe 14. Liquid, such as water, can be added to the lower carafe 14 at upper opening 90 along a path as indicated by arrow P1.

Figure 4:
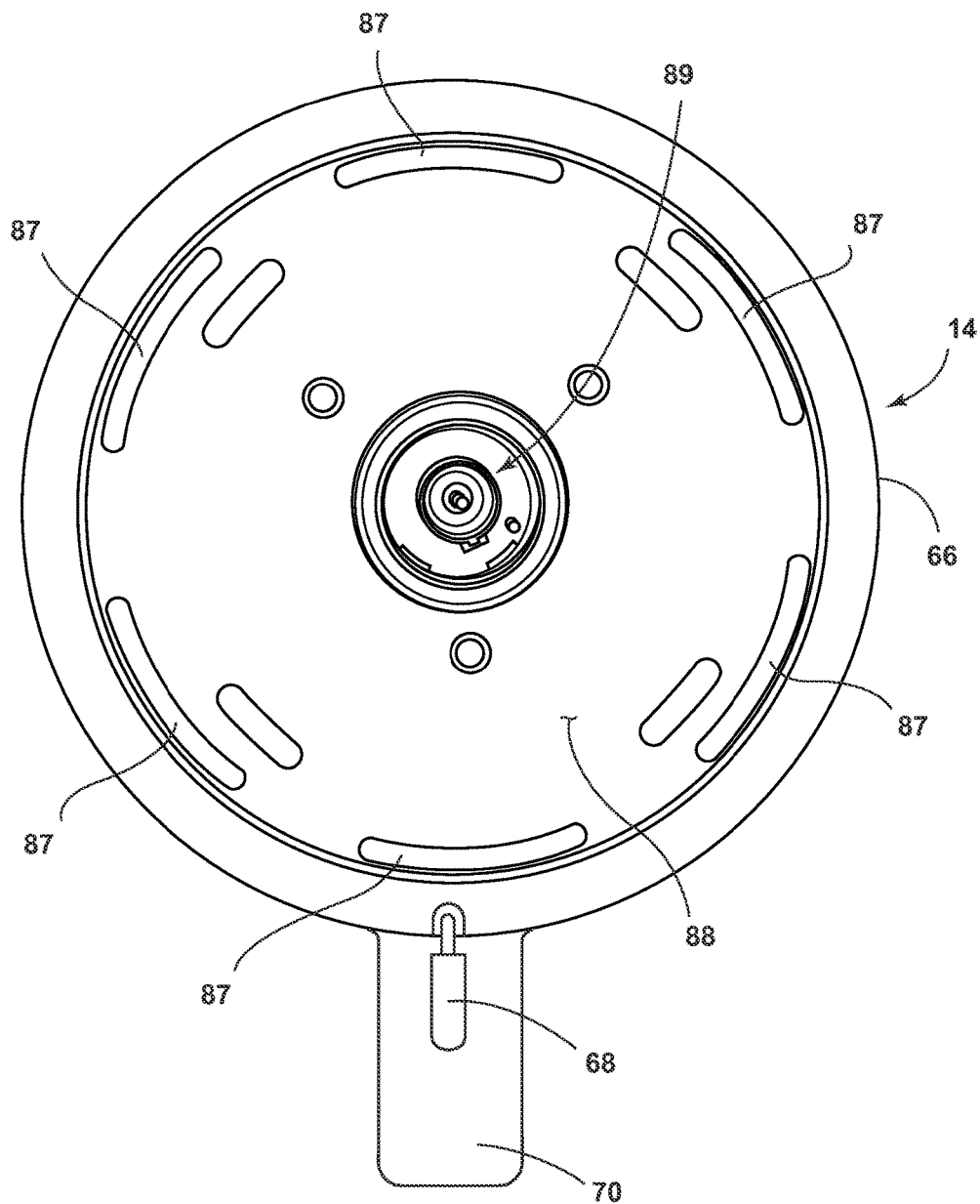
FIG. 4 is a bottom plan view of a base portion of the lower carafe of FIG. 3.

Referring now to FIG. 4, the base portion 66 of lower carafe 14 is shown having a bottom surface 88 with an inwardly extending and centrally disposed receptacle 89. In assembly, the upwardly extending power plug 82 disposed on support surface 80 of support stand 16 is configured to be vertically received in the receptacle 89 of the lower carafe 14. In this way, the lower carafe 14 is electrically coupled to and powered by the support stand 16. The lower carafe 14 is supported on the support stand 16 at the abutment of bottom surface 88 of the lower carafe 14 and support surface 80 (FIG. 2) of the support stand 16. The bottom surface 88 of lower carafe 14 further includes a plurality of stand-off feet 87 disposed around a perimeter thereof. The feet 87 can be molded-in structures or rubberized structures adhered to the bottom surface 88 for providing grip to the abutment of bottom surface 88 of the lower carafe 14 and support surface 80 of the support stand 16.

Figure 5:
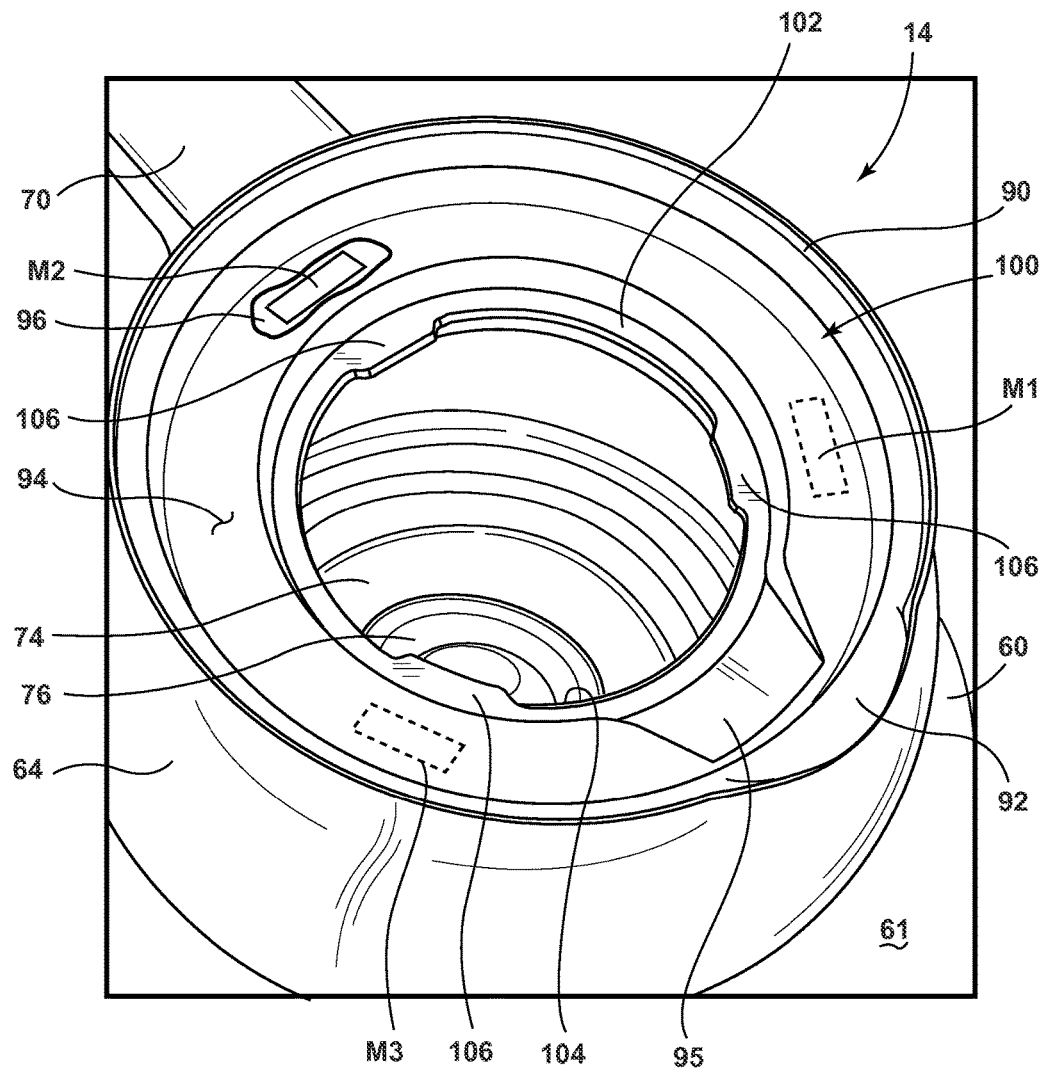
FIG. 5 is a top perspective view of a coupling portion of the lower carafe of FIG. 3.
Figure 11:
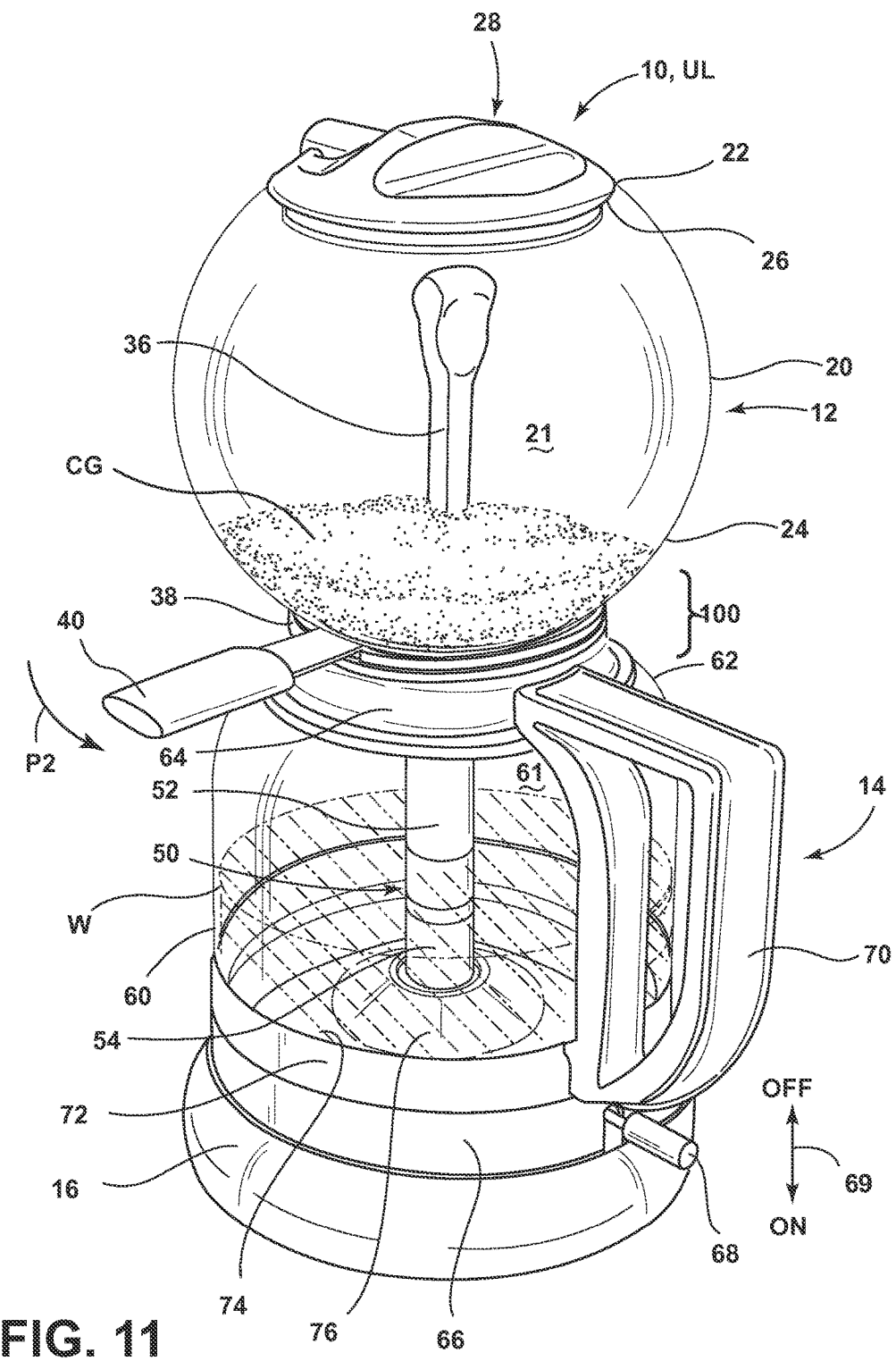
FIG. 11 is a perspective view of the upper brewing unit of FIG. 10 disposed on an upper portion of the lower carafe in an aligned and unlocked condition, wherein the lower carafe includes an amount of water.
Figure 12:
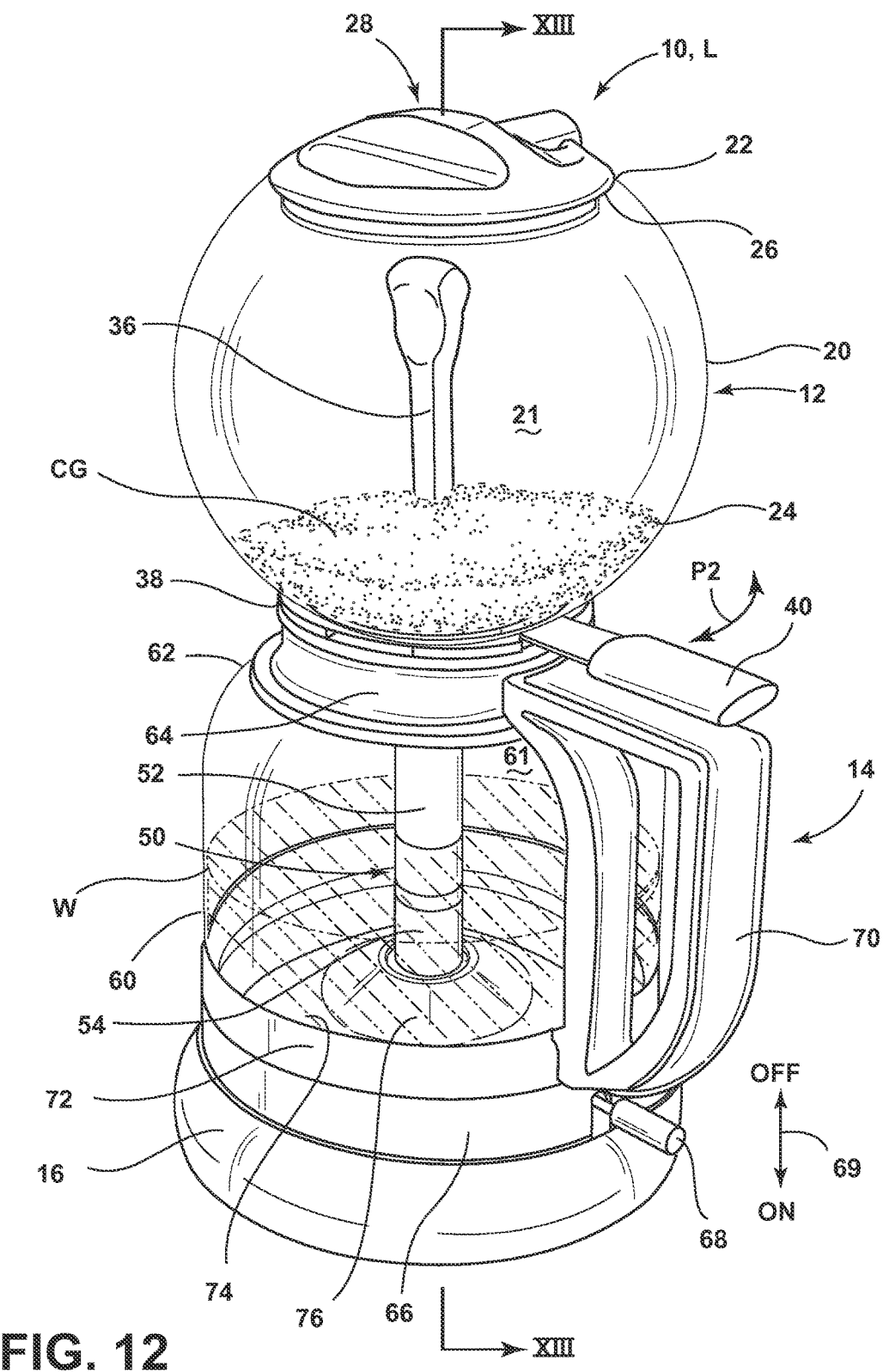
FIG. 12 is a perspective view of the upper brewing unit and lower carafe of FIG. 11 in a locked condition.

Referring now to FIG. 5, the collar 64 of the lower carafe 14 includes upper opening 90 having a spout member 92 disposed thereon. The collar 64 further includes an upper landing 94 having a spout relief portion 95 aligned with spout member 92 of the upper opening 90 for facilitating the pouring of liquid from the lower carafe 14. The upper landing 94 is a generally planar landing disposed around the upper opening 90. The upper landing 94 includes a body portion 96 having a material thickness in which a plurality of magnets M1, M2 and M3 are disposed. In this way, the upper landing 94 defines a lower portion of a magnetic coupling system 100 for coupling the lower carafe 14 with the upper brewing unit 12 in a manner as shown in FIGS. 1, 11 and 12. The upper landing 94 is contemplated to be comprised of a molded polymeric material, where in the magnets M1, M2 and M3 are embedded in and concealed by the polymeric material of the body portion 96 of the upper landing 94. As further shown in FIG. 5, the collar 64 of the lower carafe 14 further includes a lower landing 102 defining a lower opening 104 into the cavity 61 of the vessel 60. The lower landing 102 further includes a number of engagement features 106 which are configured to engage corresponding engagement features disposed on the upper brewing unit 12, as further described below. In this way, the lower carafe 14 not only magnetically couples to the upper brewing unit 12 in assembly, but also mechanically couples to the upper brewing unit 12 via a mechanical interlock feature provided by engagement features 106.

Figure 6:
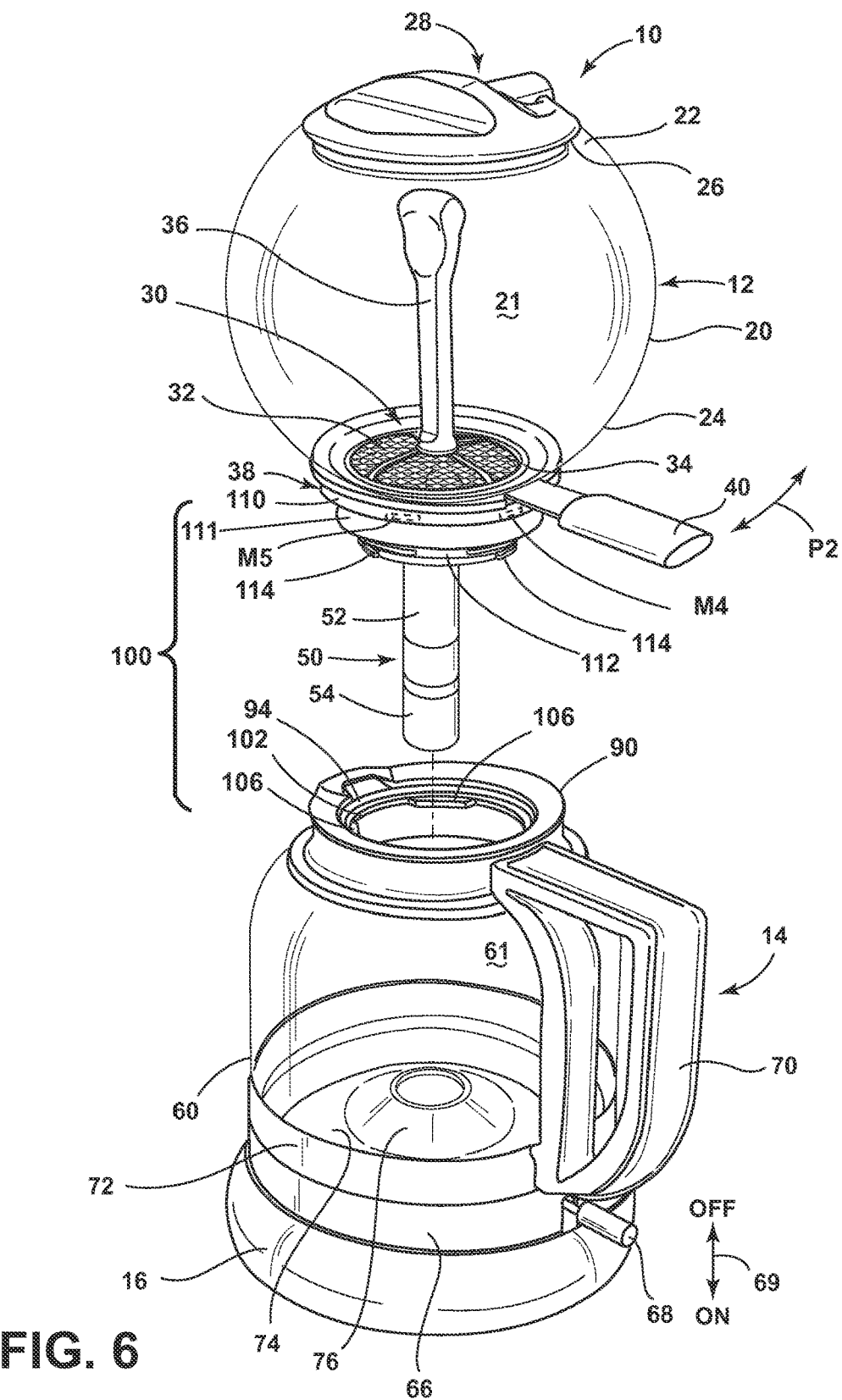
FIG. 6 is a perspective view of the upper brewing unit of FIG. 1 exploded away from the lower carafe.
Figure 8:
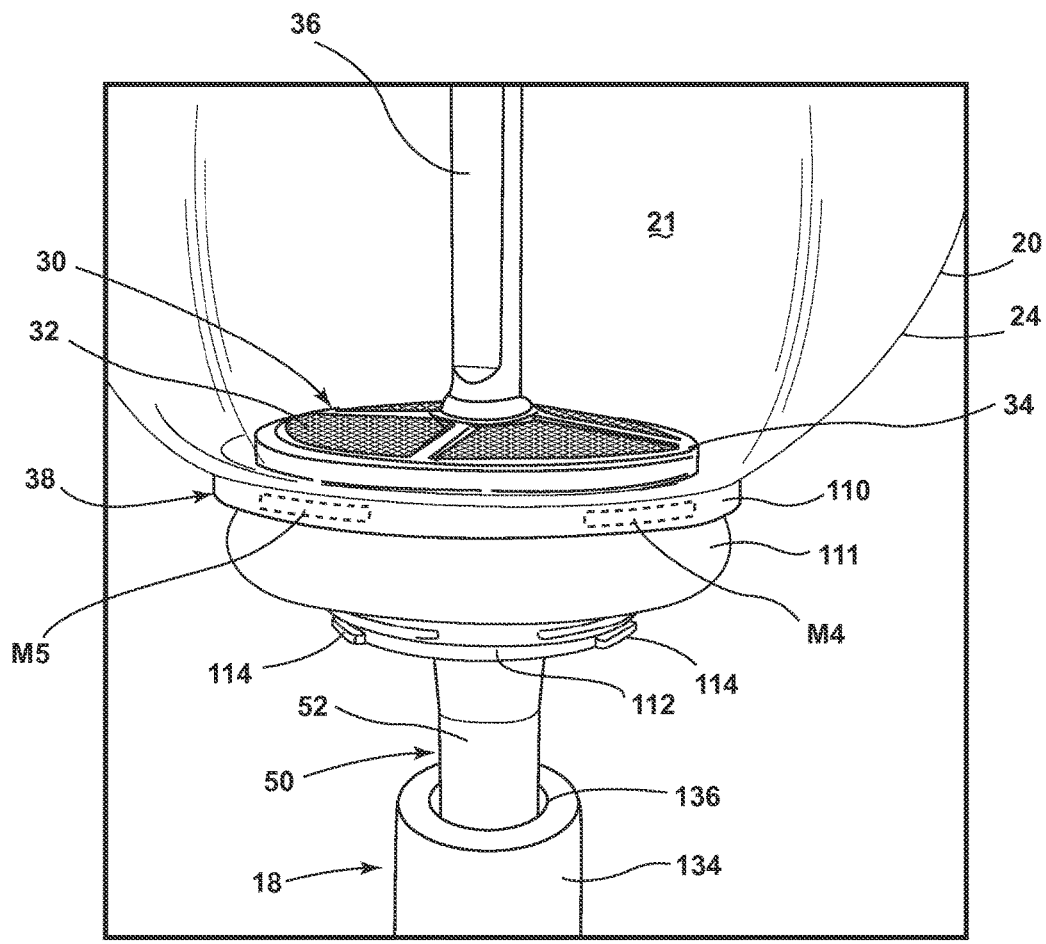
FIG. 8 is a perspective view of the upper brewing unit of FIG. 7 being mounted on the upper brewing unit support stand.

Referring now to FIG. 6, the coffee maker 10 is shown with the upper brewing unit 12 exploded away from the lower carafe 14. As shown in FIG. 6, the collar 38 of the upper brewing unit 12 includes an upper landing 110 having a plurality of magnets M4, M5 embedded therein. The magnets M4, M5 disposed in the upper landing 110 of the upper brewing unit 12 are best shown in FIG. 8 described below. Much like the upper landing 94 of the lower carafe 14, the upper landing 110 of the upper brewing unit 12 is contemplated to be comprised of a molded polymeric material, where in the magnets M4, M5 are embedded in and concealed by the polymeric material of the upper landing 110. The collar 38 of the upper brewing unit 12 further includes a lower landing 112 having a plurality of engagement features 114 disposed thereon. The engagement features 114 of the upper brewing unit 12 are complementary engagement features to the engagement features 106 disposed on the collar 64 of the lower carafe 14. Thus, it is contemplated that the upper brewing unit 12 is mechanically coupled to the lower carafe 14 using the corresponding engagement features 106, 114 of the lower carafe 14 and upper brewing unit 12, respectively. This engagement can be a twist-lock engagement, or can be an aligned abutment engagement of the engagement features 106, 110. The upper landing 110 of the upper brewing unit 12 defines an upper magnetic coupler to the magnetic coupling system 100 of the coffee maker 10. Thus, the upper magnetic coupler of upper landing 110 of the upper brewing unit 12 is configured to magnetically couple to the lower magnetic coupler disposed in the upper landing 94 of the lower carafe 14 via a magnetic attraction between magnets M1-M5. When the upper brewing unit 12 is magnetically coupled to the lower carafe 14 using magnetic coupling system 100, it is contemplated that a seal is formed between the upper brewing unit 12 and the lower carafe 14, and the engagement features 114 of the upper brewing unit 12 are aligned with the engagement features 106 of the lower carafe 14, such that a user can twist-lock the engagement features 106, 114 into a mechanical engagement to ensure that the seal between the upper brewing unit 12 and lower carafe 14 is maintained during a brewing sequence. The upper brewing unit 12 can be rotated on the lower carafe 14 by moving the handle 40 of the upper brewing unit 12 along the path as indicated by arrow P2 to either lock or unlock the upper brewing unit 12 from the lower carafe 14 using engagement features 106, 114. As further shown in FIG. 6, a rubberized seal 111 is disposed between the upper landing 110 and lower landing 112 around collar 38. The seal 111 is configured to seal to the lower carafe 14 at the collar 64 of the lower carafe. The seal 111 is a flexibly resilient seal which provides for an air-tight seal between the upper brewing unit 12 and lower carafe 14, such that a vacuum can be formed therebetween, as further described below.

It is contemplated that any number of magnets can be disposed in the upper landings 94, 110 of the magnetic coupling system 100, so long as sufficient magnetic attraction exists to form a seal between the upper brewing unit 12 and the lower carafe 14. It is contemplated that the number of magnets disposed in the upper landings 94, 110 of the magnetic coupling system 100 will be an equal number for proper alignment of each magnet with a corresponding magnet. Magnets shown in the accompanying figures include magnets M1-M5, however, it is contemplated that the illustrated embodiment will have 6 magnets, such that all magnets, or magnetic material, will have an associated counterpart. It is further contemplated that the magnets M1-M5 can be exposed magnets which physically contact one another in assembly, or the magnets M1-M5 can be embedded magnets as shown herein. The magnetic forces in the magnetic coupling system 100 can also be formed between a grouping of magnets and a magnetically attractive material, such as iron, nickel, cobalt and other like metallic materials. In this way, the magnets can be disposed in either the upper brewing unit 12 or the lower carafe 14, so long as the reciprocal part of coffee maker 10 includes a magnetically attractive material sufficient to form a magnetic coupling between the two. The magnets M1-M5 define upper and lower magnetic arrays as disposed in the upper landing 94 of the lower carafe 14, and the upper landing 110 of the upper brewing unit 12. It is contemplated that the magnets M1-M5 could be permanent magnets which are termed "permanent" in that they create their own magnetic field which persists against influences which might otherwise demagnetize them. Further, the upper landing 110 of the upper brewing unit 12 is configured to have a reciprocal shape to the upper landing 94 of the lower carafe 14, such that a seal is magnetically formed between the upper landing 110 of the upper brewing unit 12 and the upper landing 94 of the lower carafe 14 at seal 111. This seal is air-tight and is mechanically retained via the engagement of engagement features 114 of the upper brewing unit 12 and engagement features 106 of the lower carafe 14 engaging in a twist-lock manner to mechanically couple the upper brewing unit 12 to the lower carafe 14.

Figure 7:
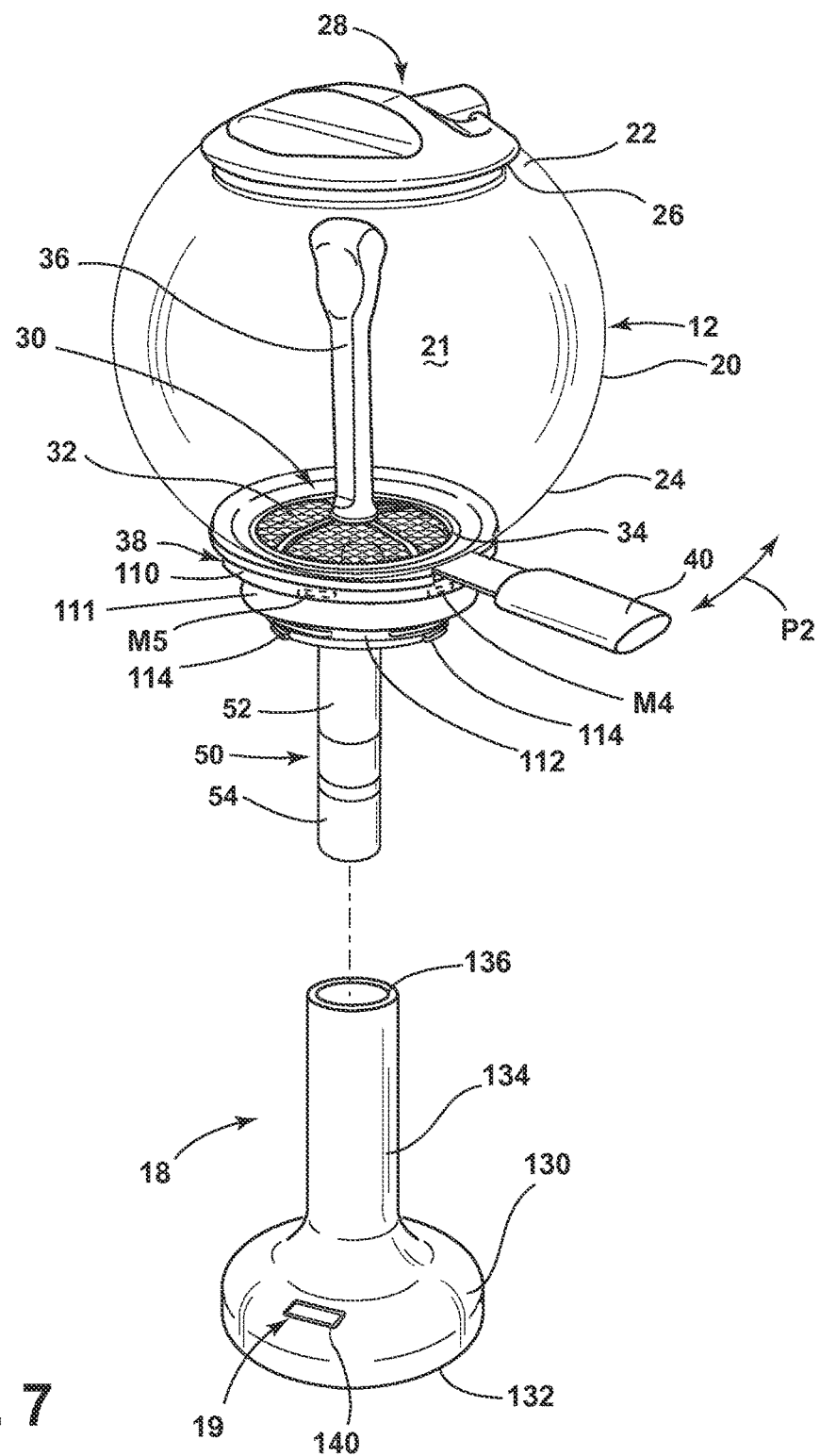
FIG. 7 is a perspective view of the upper brewing unit of FIG. 6 exploded away from an upper brewing unit support stand.

Referring now to FIG. 7, the upper brewing unit 12 is shown as removed from the lower carafe 14 and prepared for placement on the upper brewing unit support stand 18. The upper brewing unit support stand 18 includes a base portion 130 having a generally planar bottom surface 132 which is configured to support the upper brewing unit support stand 18 on a countertop surface. Extending upwardly from the base portion 130, a hollow receiving tube 134 is disposed having an upper opening 136. The upper brewing unit 12 is received on the upper brewing unit support stand 18 via an engagement between the transfer tube 50 of the upper brewing unit 12 being received in receiving tube 134 as better shown in FIG. 8. The upper brewing unit support stand 18 further includes a scale 19 that is integrally formed in the base portion 130. The scale 19 includes a display screen 140 for displaying the weight of coffee grounds added to the upper brewing unit 12. The upper brewing unit support stand 18 of the present concept has a number of functional uses. For instance, after a brewing sequence, the upper brewing unit 12 must be removed from the lower carafe 14 for a user to access brewed coffee disposed in the lower carafe 14. The upper brewing unit 12 is a fragile piece having a generally glass vessel 20. After a brewing sequence, the upper brewing unit 12 will be hot and difficult to handle outside of the outwardly extending handle 40. Thus, the upper brewing unit support stand 18 is used to hold the upper brewing unit 12 in an upright configuration to allow the upper brewing unit 12 to cool after a brewing sequence. Further, as shown in FIG. 7, the transfer tube 50 of the upper brewing unit 12 can be received in the receiving tube 134 of the upper brewing unit support stand 18 for measuring an amount of coffee grounds using the integrated scale 19 of the upper brewing unit support stand 18. Referring now to FIG. 8, the transfer tube 50 is being inserted into the receiving tube 134 of the upper brewing unit support stand 18 at upper opening 136. As shown in FIG. 8, the engagement features 114 of the lower landing 112 of collar 38 are clearly shown. Further, embedded magnets M4, M5 in the upper landing 110 of the collar 38 are also shown.

Figure 9A:
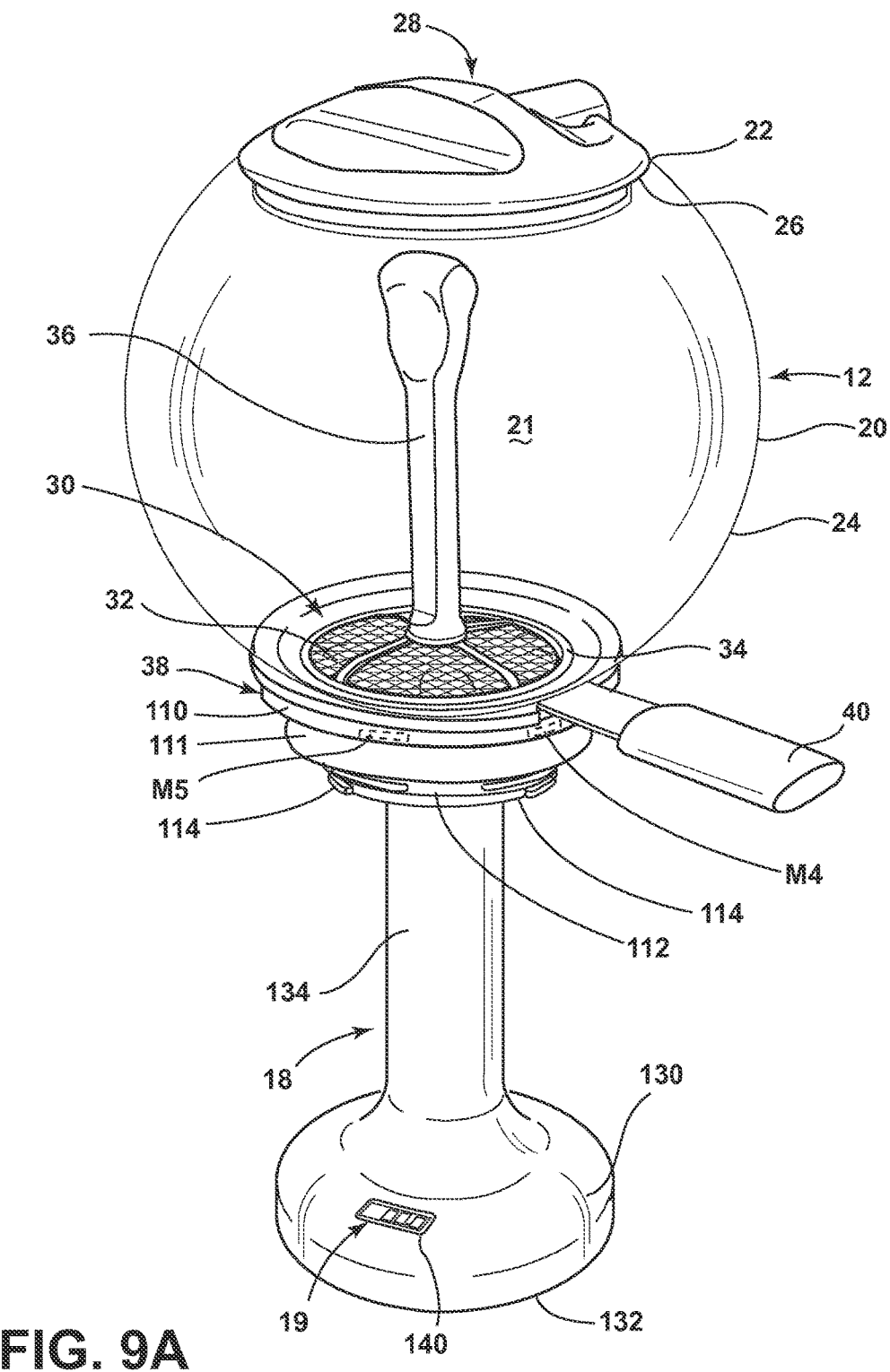
FIG. 9A is a perspective view of the upper brewing unit of FIG. 8 as fully mounted on the upper brewing unit support stand.
Figure 9B:
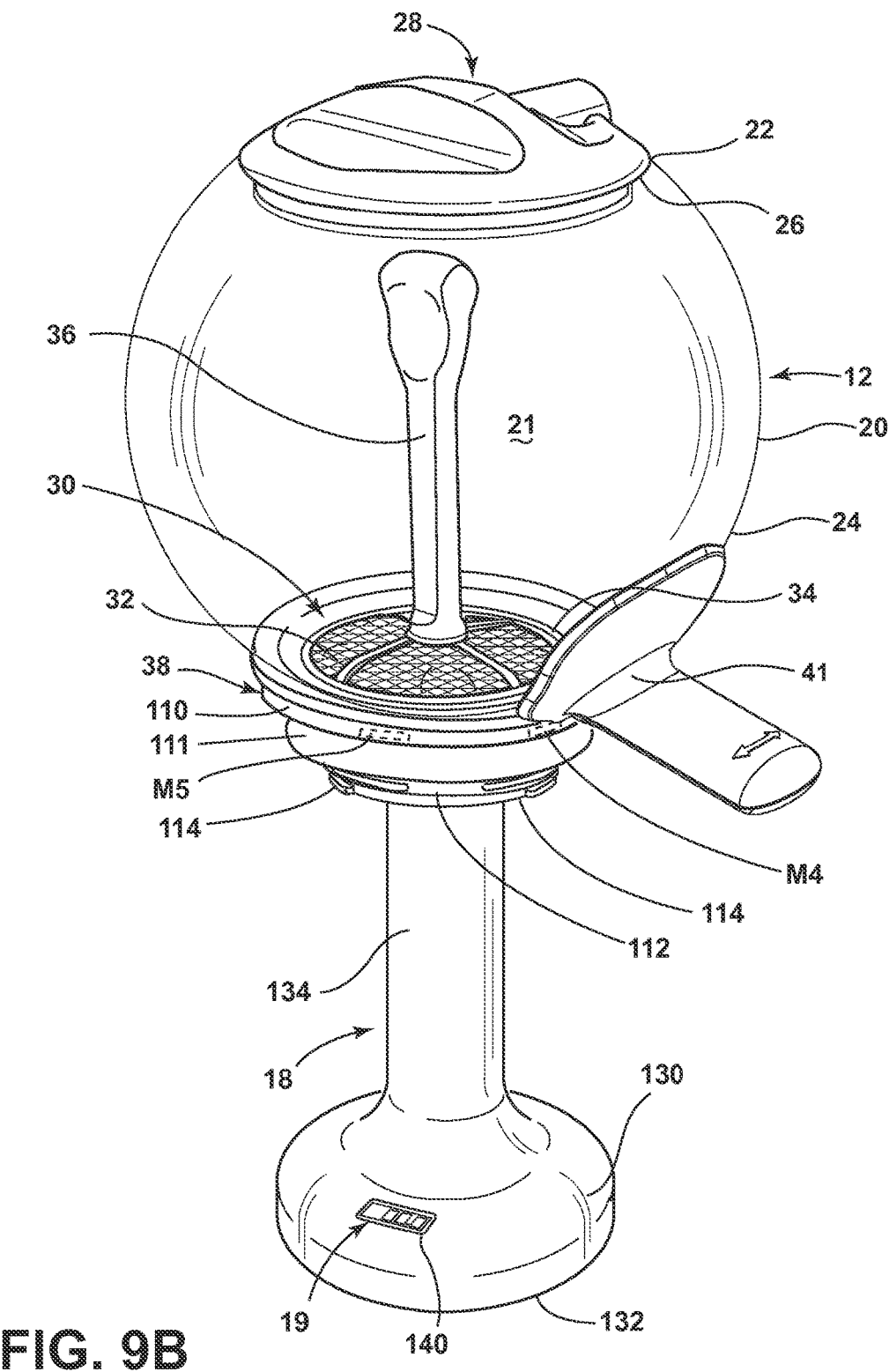
FIG. 9B is a perspective view of the upper brewing unit of FIG. 9A, wherein the upper brewing unit includes a heat shield.

Referring now to FIG. 9A, the upper brewing unit 12 is fully seated on the upper brewing unit support stand 18 at receiving tube 134. As shown in FIG. 9A, the upper brewing unit 12 is retained in an upright configuration on the upper brewing unit support stand 18, as it would be positioned when coupled to the lower carafe 14, as shown in FIG. 1. The integrated scale 19 shown in the base portion 130 of the upper brewing unit support stand 18 is configured to "zero-out" or "tare" to 00.0, as shown in FIG. 9A, when the upper brewing unit 12 is fully received on the upper brewing unit support stand 18. In this way, the integrated scale 19 is ready to measure an amount of coffee added to the upper brewing unit 12 for brewing in a brewing sequence. It is contemplated that the integrated scale 19 can be powered using battery power which is contemplated to be housed in a base portion 130 of the upper brewing unit support stand 18. Any number of weight measuring sensors are also contemplated to be integrated into the upper brewing unit support stand 18, such that the scale 19 can measure the weight of an amount coffee grounds added to the vessel 20. As shown in FIG. 9A, the display screen 140 reads "00.0" and is thus prepared to measure an amount of ground coffee added to the upper brewing unit 12. As shown in FIG. 9B, the upper brewing unit 12 is shown with a heat shield 41 disposed adjacent to the outwardly extending handle 40. The heat shield 41 is configured to guard a user's hand, as engaged with the handle 40, from high temperatures of the vessel 20 of the upper brewing unit 12 after a brewing sequence. It is contemplated that the heat shield 41 is comprised of a polymeric material having a low thermal conductivity, and further, an insulating member may be disposed between the heat shield 41 and the vessel 20 in assembly to slow heat transfer from the vessel 20.

Figure 10:
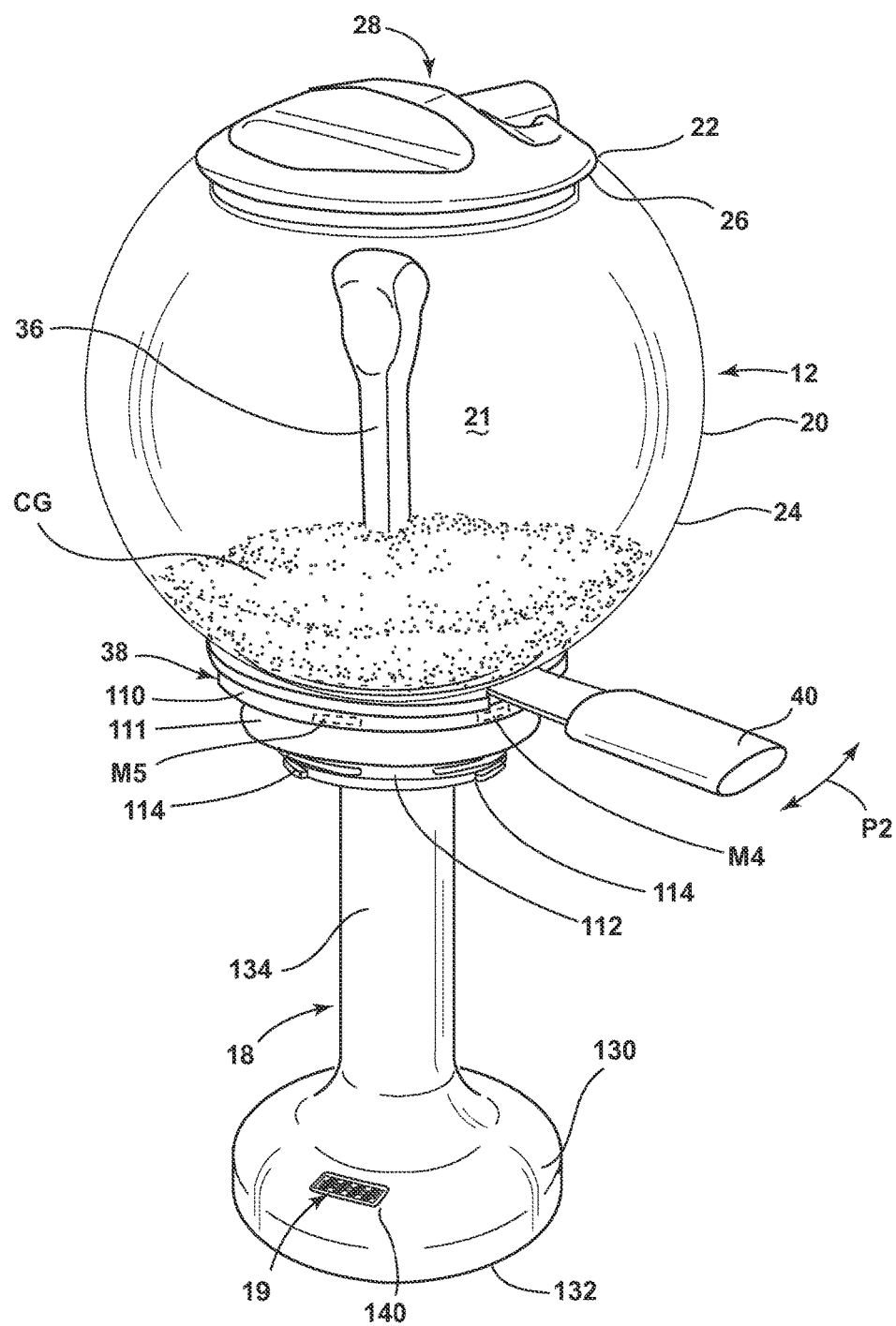
FIG. 10 is a perspective view of the upper brewing unit of FIG. 9A having an amount of coffee grounds disposed therein.

Referring now to FIG. 10, an amount of coffee grounds CG has been added to the cavity 21 of vessel 20 of the upper brewing unit 12. It is contemplated that the coffee grounds CG have been added to the vessel 20 by removing the lid 28, thereby providing access to the upper opening 26 of the upper brewing unit 12. The coffee grounds CG are then added to the upper brewing unit 12 and the lid 28 is again positioned on upper opening 26 of the vessel 20 to close the upper brewing unit 12. The coffee grounds CG are disposed over the filter assembly 30, shown in FIG. 1, of the upper brewing unit 12 as added to the vessel 20. The display screen 140 of the integrated scale 19 of the upper brewing unit support stand 18 now reads "##.#." Thus, in FIG. 10, it is contemplated that the integrated scale 19 is displaying a measured weight of the coffee grounds CG received in the vessel 20. It is further contemplated that the weight displayed on the display screen 140 of the integrated scale 19 will correlate to the measurement markings or measurement indications 63, shown in FIG. 3, on the vessel 60 of the lower carafe 14. In this way, a user will measure an amount of coffee grounds CG and then add water to the lower carafe 14 in an amount that correlates to the amount of coffee grounds CG weighed on the upper brewing unit support stand 18 by integrated scale 19.

Referring now to FIG. 11, the upper brewing unit 12 is shown disposed on the lower carafe 14 in an unlocked condition UL, such that the coffee maker 10 is in an unlocked condition UL. The lower carafe 14 is shown with an amount of water W disposed in the cavity 61 of vessel 60, and the handle 40 of the upper brewing unit 12 is shown misaligned with the handle 70 of the lower carafe 14. In the unlocked condition UL shown in FIG. 11, it is contemplated that the engagement features 106, 114 are properly aligned and ready for twist-lock engagement by a user moving the outwardly extending handle 40 of the upper brewing unit 12 in a path as indicated by arrow P2 to align the outwardly extending handle 40 of the upper brewing unit 12 with the handle 70 of the lower carafe 14. In FIG. 11, the outwardly extending handle 40 of the upper brewing unit 12 is shown disposed on a left-hand side of the handle 70 of the lower carafe 14. It is further contemplated that the coffee maker 10 can be in an unlocked condition UL with the outwardly extending handle 40 disposed on an opposite, or right-hand, side of handle 70, such that the outwardly extending handle 40 of the upper brewing unit 12 can be rotated in either direction along the path indicated by arrow P2 (as shown in FIG. 12) to lock or unlock the upper brewing unit 12 from the lower carafe 14.

Referring now to FIG. 12, the coffee maker 10 is shown in a locked condition L as the outwardly extending handle 40 of the upper brewing unit 12 has rotated in the path as indicated by arrow P2 to align the outwardly extending handle 40 with the handle 70 of the lower carafe 14. In this way, the upper brewing unit 12 rotates, such that the collar 38 of the upper brewing unit 12 rotates with respect to the collar 64 of the lower carafe 14. This rotation causes the twist-lock engagement of the engagement features 106, 114 to ensure a mechanical coupling or locking of the upper brewing unit 12 with the lower carafe 14, such that the magnetically formed seal is maintained between the upper brewing unit 12 and the lower carafe 14. As further shown in FIG. 12, the actuation switch 68 is in the off-position, however, the actuation switch 68 is ready to be moved to the on-position for powering and initiating a brewing sequence which will now be described.

Figure 13:
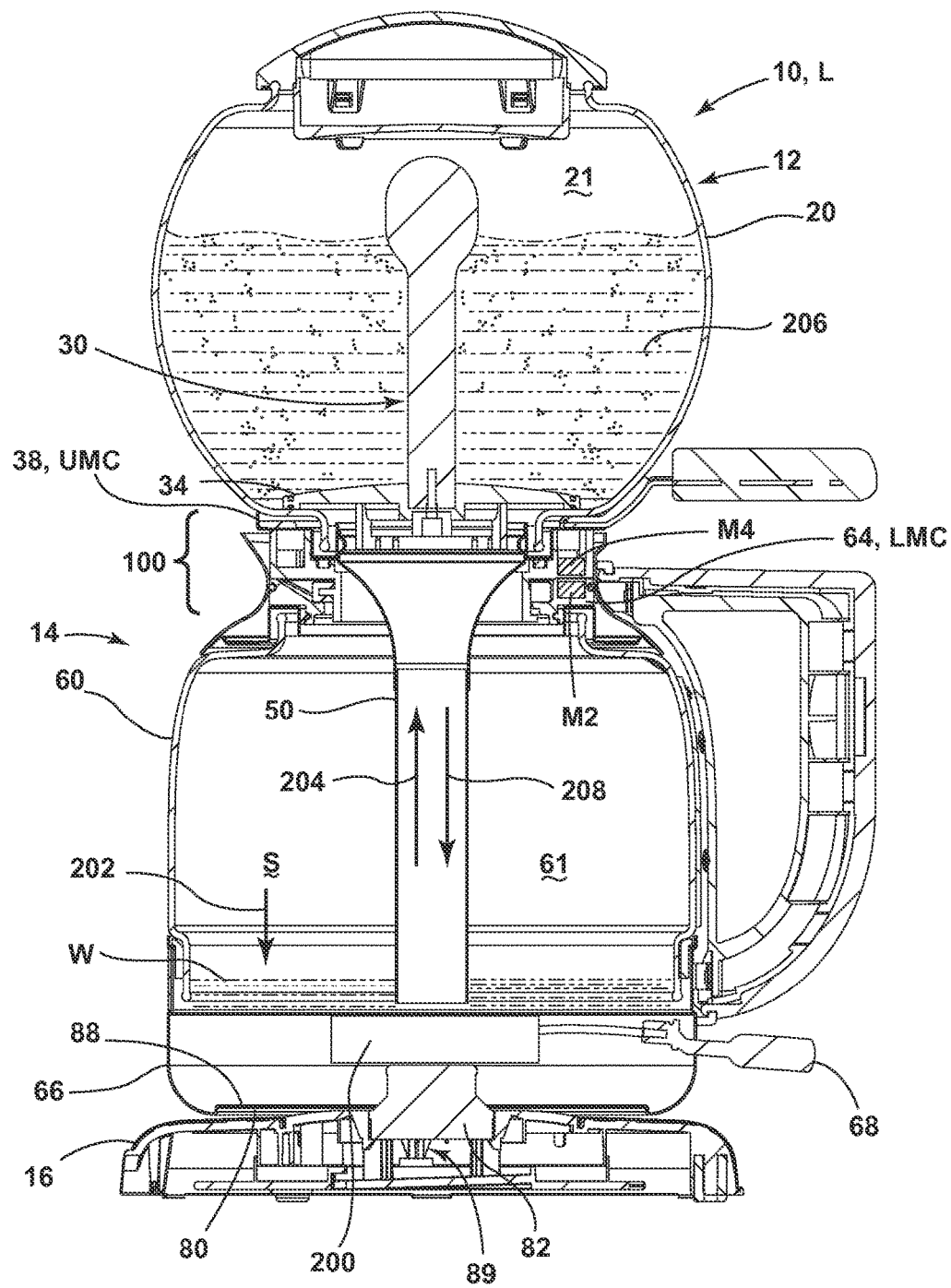
FIG. 13 is a cross-sectional view of the vacuum-type coffee maker FIG. 12 showing a magnetic coupling between the upper brewing unit and the lower carafe taken along line XIII of FIG. 12 and further showing relative movement of the water from the lower carafe to the upper brewing unit.
Figure 14:
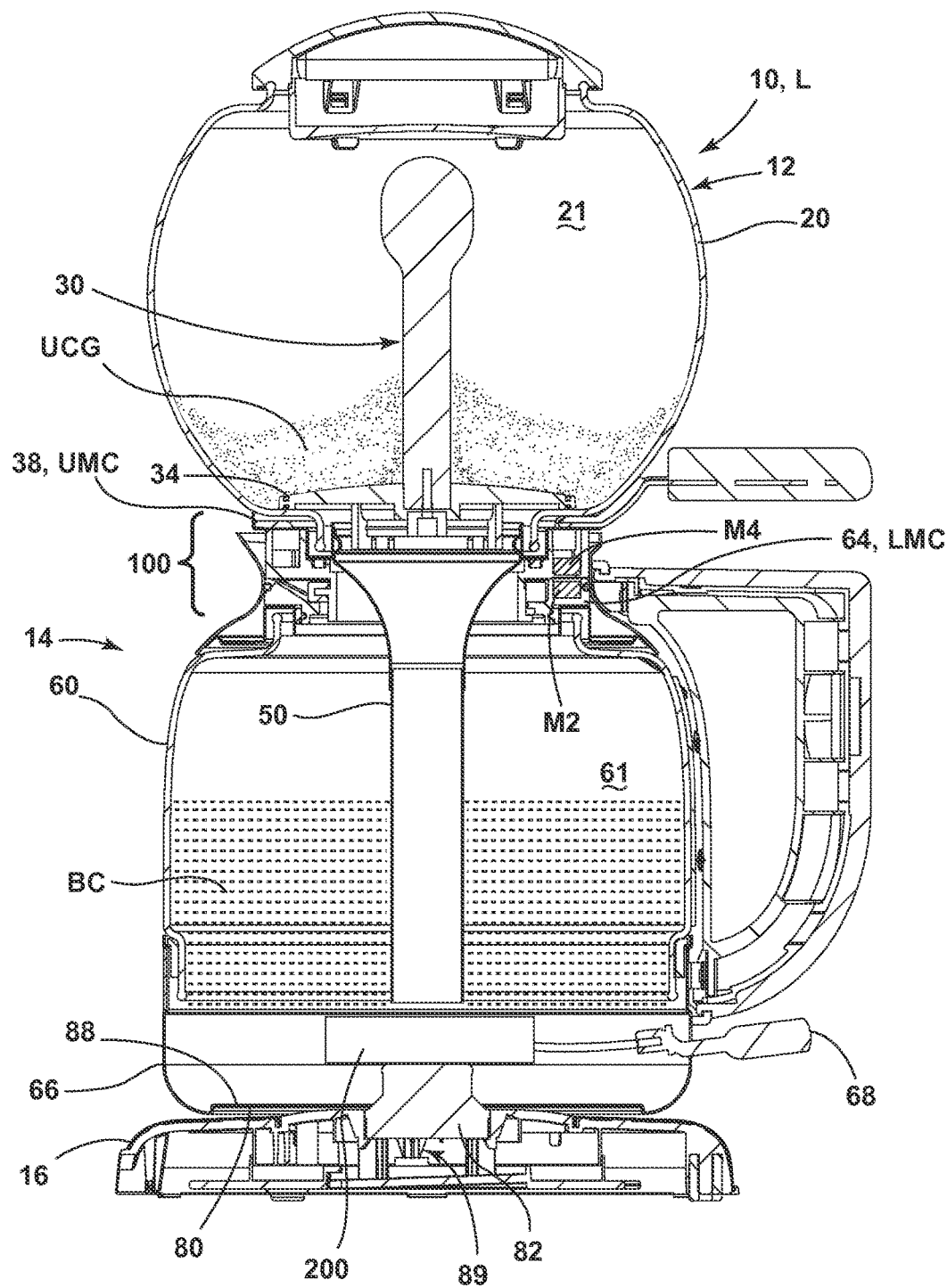
FIG. 14 is a cross-sectional view of the vacuum-type coffee maker of FIG. 13, wherein brewed coffee is disposed in a lower carafe.

As shown in FIG. 12, with the upper brewing unit 12 in the mechanically locked condition L, the coffee maker 10 is prepared for a brewing sequence which is initiated by a user actuating the actuation switch 68 to the on-position. Referring now to FIG. 13, the actuation switch 68 is shown in the on-position and a heating element 200 is then energized. As noted above, the coffee maker 10 is powered by the coupling of the power plug 82 and receptacle 89 which is an electrical coupling to power the coffee maker 10 through the support stand 16. The heating element 200 is contemplated to include temperature sensors and/or a timing unit that controls the heat and the duration of heat in a brewing sequence. As shown in FIG. 13, it is contemplated that the heating element 200 has heated the water W in the lower carafe 14 such that steam S develops within the cavity 61 of the lower carafe 14. As noted above, the upper brewing unit 12 and the lower carafe 14 are magnetically and mechanically coupled, such that the steam S applies pressure to the water W in a direction as indicated by arrow 202. This downward pressure forces the water W up the transfer tube 50 to the cavity 21 of the upper brewing unit 12 in a direction as indicated by arrow 204. As shown in FIG. 13, the water has moved up the transfer tube 50 to the upper brewing unit 12 through the filter assembly 30. As further shown, the water W has mixed with the coffee grounds CG (FIG. 12) as referenced by reference numeral 206 in FIG. 13. After a sufficient heating time, the heating element 200 will de-energize and the switch 68 will move to the OFF position, such that the lower carafe 14 will cool to a point, wherein a vacuum formed between the lower carafe 14 and the upper brewing unit 12 will draw the water and coffee ground combination 206 back through the transfer tube 50 into the cavity 61 of the lower carafe 14 in a direction as indicated by arrow 208. The coffee and water combination 206, when moving to the lower carafe 14 from the upper brewing unit 12, will filter through the filter assembly 30, such that brewed coffee BC, shown in FIG. 14, will be disposed within the vessel 60 of the lower carafe 14, while the used coffee grounds UCG remain in the upper brewing unit 12. The upper brewing unit 12 can now be removed from the lower carafe 14 and placed on the upper brewing unit support stand 18, as described above. A user can now pour the brewed coffee BC from the lower carafe 14 for serving. It is also contemplated that the lid 28 of the upper brewing unit 12 can be used to close the upper opening 90 of the lower carafe 14 when the upper brewing unit 12 has been removed from the lower carafe 14.

Referring again to FIGS. 13-14, the magnet M4 disposed in the upper landing 110 of the upper brewing unit 12 is shown aligned with magnet M2 of the upper landing 94 of the lower carafe 14. In this way, the upper landing 110 of collar 38 of the upper brewing unit 12 defines an upper magnetic coupler UMC which is configured to magnetically couple to a lower magnetic coupler LMC which is defined by the upper landing 94 of collar 64 of the lower carafe 14. Together, the upper magnetic coupler UMC and the lower magnetic coupler LMC comprise upper and lower portions of magnetic coupling system 100 disposed between the upper brewing unit 12 and the lower carafe 14 for forming a seal therebetween and for aligning engagement features 106, 114 as described above.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical, magnetic or mechanical) directly or indirectly to one another. Such joining may be stationary in nature or movable in nature. Such joining may be achieved with the two components (electrical, magnetic or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A coffee maker, comprising:
   an upper brewing unit having a vessel with upper and lower portions, and a first collar disposed on the lower portion, the first collar having a first magnetic array disposed therein to define an upper magnetic coupler and one or more engagement features; and
   a lower carafe configured to receive the upper brewing unit, the lower carafe having a vessel with an upper portion and a base portion, and a second collar disposed over the upper portion of the lower carafe, the second collar having an upper opening with an upper landing inwardly extending from the upper opening and one or more engagement features, wherein the upper landing includes a second magnetic array disposed therein to define a lower magnetic coupler, wherein the upper magnetic coupler is magnetically coupled to the lower magnetic coupler when the upper brewing unit is received on the lower carafe, and further wherein the one or more engagement features of the first collar of the upper brewing unit engage the one or more engagement features of the second collar of the lower carafe when the upper brewing unit is rotated relative to the lower carafe.

2. The coffee maker of claim 1, wherein the first collar of the upper brewing unit further includes an upper landing and a lower landing with a seal disposed therebetween.

3. The coffee maker of claim 2, wherein the first magnetic array of the upper brewing unit is disposed in the upper landing of the first collar of the upper brewing unit.

4. The coffee maker of claim 3, wherein the upper landing of the upper brewing unit is comprised of a molded polymeric material, and further wherein the first magnetic array is embedded in the molded polymeric material of the upper landing of the upper brewing unit.

5. The coffee maker of claim 4, wherein the one or more engagement features of the first collar of the upper brewing unit are disposed on the lower landing of the upper brewing unit.

6. The coffee maker of claim 5, wherein the upper landing of the lower carafe is comprised of a molded polymeric material, and further wherein the second magnetic array of the lower carafe is embedded in the molded polymeric material of the upper landing of the lower carafe.

7. The coffee maker of claim 6, including:
   a lower landing inwardly extending from the upper landing of the second collar of the of the lower carafe to define a stepped configuration therebetween, wherein the one or more engagement features of the second collar are positioned along the lower landing.

8. A coffee maker, comprising:
   a lower carafe having a vessel with a first collar disposed over an upper portion of the vessel, the first collar having an upper landing defining an upper opening with one or more magnets disposed therein to define a lower magnetic coupler, and a lower landing inwardly extending from the upper landing to define a stepped configuration therebetween; and
   an upper brewing unit removeably received on the lower carafe between mechanically locked and unlocked conditions, the upper brewing unit having a vessel with a second collar disposed on a lower portion thereof, the second collar further includes a seal and an upper landing with one or more magnets disposed in the upper landing to define an upper magnetic coupler, wherein the upper magnetic coupler of the upper brewing unit is magnetically coupled to the lower magnetic coupler of the lower carafe when the upper brewing unit is received on the lower carafe to form a seal therebetween.

9. The coffee maker of claim 8, wherein the upper magnetic coupler and the lower magnetic coupler define a magnetic coupling system disposed between the upper brewing unit and the lower carafe.

10. The coffee maker of claim 9, wherein the second collar of the upper brewing unit further includes a lower landing having one or more engagement features.

11. The coffee maker of claim 10, wherein the lower landing of the lower carafe further includes one or more engagement features.

12. The coffee maker of claim 11, wherein:
    the one or more engagement features disposed on the lower landing of the lower carafe are configured to engage the one or more engagement features disposed on the lower landing of the upper brewing unit when the upper brewing unit is in the locked condition.

13. The coffee maker of claim 12, including:
    an upper brewing unit support stand having a base portion and an upwardly extending receiving tube, wherein the upper brewing unit is configured to be removeably received on the upper brewing unit support stand when the upper brewing unit is removed from the lower carafe.

14. The coffee maker of claim 13, including:
    a transfer tube extending downwardly from the upper brewing unit, wherein the transfer tube of the upper brewing unit is removeably received in the receiving tube of the upper brewing unit support stand when the upper brewing unit is received on the upper brewing unit support stand.

15. The coffee maker of claim 14, including:
    a scale having a display screen disposed in the base portion of the upper brewing unit support stand, wherein the scale is configured to measure an amount of coffee grounds received in the vessel of the upper brewing unit.

16. The coffee maker of claim 8, including:
    a heating element disposed in the lower carafe; and
    a support stand configured to removeably receive the lower carafe, wherein the heating element of the lower carafe is powered by the support stand as received thereon.

17. A method of forming a seal between an upper brewing unit and a lower carafe in a vacuum coffee maker, the method comprising the steps of:
    coupling the upper brewing unit to the lower carafe using a magnetic coupling system wherein the magnetic coupling system includes a lower magnetic coupler disposed in a first collar of the lower carafe and an upper magnetic coupler disposed in a second collar of the upper brewing unit, wherein the first collar of the lower carafe is positioned over an upper portion of a vessel and included an upper landing and a lower landing inwardly extending from the upper landing to define a stepped configuration therebetween;
    forming a seal between the upper brewing unit and the lower carafe;
    aligning a first set of engagement features disposed on a lower landing inwardly extending from the second collar of the upper brewing unit with a second set of engagement features disposed on a lower landing inwardly extending from the first collar of the lower carafe; and locking the first set of engagement features of the upper brewing unit with the second set of engagement features of the lower carafe to retain the seal therebetween.

\* \* \* \* \*